United States Patent
Chen (10) Patent No.: US 8,422,816 B2
(45) Date of Patent: *Apr. 16, 2013

(54) METHOD AND APPARATUS FOR PERFORMING BAD PIXEL COMPENSATION

(75) Inventor: Yung-Wei Chen, Taipei (TW)

(73) Assignee: Silicon Motion Inc., Jhubei, Hsinchu County (TW)

( * ) Notice: Subject to any disclaimer, the term of this patent is extended or adjusted under 35 U.S.C. 154(b) by 297 days.

This patent is subject to a terminal disclaimer.

(21) Appl. No.: 12/917,499

(22) Filed: Nov. 2, 2010

(65) Prior Publication Data

US 2012/0039545 A1    Feb. 16, 2012

(30) Foreign Application Priority Data

Aug. 11, 2010 (TW) ................ 99126728 A (51) Int. Cl.
*G06K 9/40* (2006.01)
*H04N 1/38* (2006.01)
*H04N 5/08* (2006.01)
*G09G 5/00* (2006.01)

(52) U.S. Cl.
USPC ............ 382/274; 358/463; 345/611; 348/533

(58) Field of Classification Search .................. 382/162, 382/173, 254, 266, 272, 274–275, 305, 312; 358/463, 515, 518, 647; 345/597, 611; 348/294, 348/533

See application file for complete search history.

(56) References Cited

U.S. PATENT DOCUMENTS

| | | | | |
|---|---|---|---|---|
| 7,356,167 | B2* | 4/2008 | Kita ............................. | 382/112 |
| 7,800,661 | B2* | 9/2010 | Forutanpour ................. | 348/246 |
| 7,929,032 | B2* | 4/2011 | Tajima et al. ................. | 348/246 |
| 8,035,702 | B2* | 10/2011 | Sato et al. ..................... | 348/241 |
| 8,089,537 | B2* | 1/2012 | Hoshuyama et al. ........ | 348/246 |

\* cited by examiner

*Primary Examiner* — Kanjibhai Patel
(74) *Attorney, Agent, or Firm* — Winston Hsu; Scott Margo (57) ABSTRACT

A method for performing bad pixel compensation includes: with regard to each direction of a plurality of directions, summing up absolute values of differences between a plurality of sets of first pixel values around a target pixel of an image to generate a first detection value, and with regard to each direction of at least a portion of the directions, summing up absolute values of differences between a plurality of sets of second pixel values around the target pixel to generate a second detection value, where each set of the sets of first pixel values and the sets of second pixel values includes two pixel values corresponding to a difference; and with regard to a specific direction of the directions, selectively performing bad pixel compensation on the target pixel according to the first detection value and the second detection value. An associated apparatus is also provided.

20 Claims, 7 Drawing Sheets

METHOD AND APPARATUS FOR PERFORMING BAD PIXEL COMPENSATION

BACKGROUND OF THE INVENTION

1. Field of the Invention

The present invention relates to image processing of Bayer pattern images, and more particularly, to a method for performing bad pixel compensation and to an associated apparatus.

2. Description of the Prior Art

Typically, images generated by an image sensor of a personal computer (PC) camera (or a webcam) are Bayer pattern images. According to the related art, any sensing unit of the image sensor can generate a pixel value belonging to only a color channel within respective pixel values of a corresponding pixel. For example, complete color channels may comprise red, green, and blue color channels, and any sensing unit of the image sensor can merely generate one of red, green, and blue pixel values of a corresponding pixel, rather than all of the red, green, and blue pixel values. As a result, performing image processing is required for generating the other two pixel values within the red, green, and blue pixel values.

In order to save material costs, a conventional image processing circuit is typically implemented by utilizing low end hardware resources, causing many problems in the related art. For example, once the design thereof is oversimplified, some side effects may occur, and the image quality is poor. More particularly, it seems unlikely that the processing results of bad pixel compensation performed by the conventional image processing circuit are acceptable. Thus, a novel method is required for improving the image quality.

SUMMARY OF THE INVENTION

It is therefore an objective of the claimed invention to provide a method for performing bad pixel compensation, and to provide an associated apparatus, in order to solve the above-mentioned problems.

It is another objective of the claimed invention to provide a method for performing bad pixel compensation, and to provide an associated apparatus, in order to guarantee the image quality. Even in a situation where low end hardware resources are utilized for implementation, the present invention can still maintain high image quality.

According to a preferred embodiment of the claimed invention, a method for performing bad pixel compensation comprises: with regard to each direction of a plurality of directions, summing up absolute values of differences between a plurality of sets of first pixel values around a target pixel of an image to generate a first detection value, and with regard to each direction of at least one portion of the directions, summing up absolute values of differences between a plurality of sets of second pixel values around the target pixel to generate a second detection value, wherein each set of the sets of first pixel values and the sets of second pixel values comprises two pixel values corresponding to a difference, two pixel values of a same set belong to a same color channel, each set of first pixel values does not comprise a pixel value of the target pixel, and each set of second pixel values comprises the pixel value of the target pixel; and with regard to a specific direction of the directions, selectively performing bad pixel compensation on the target pixel according to the first detection value and the second detection value.

While the method mentioned above is disclosed, an associated apparatus for performing bad pixel compensation is further provided. The apparatus comprises a processing circuit arranged to receive at least one image signal representing an image and perform bad pixel compensation on the image, wherein the processing circuit comprises a detection module and a compensation module. In addition, with regard to each direction of a plurality of directions, the detection module sums up absolute values of differences between a plurality of sets of first pixel values around a target pixel of an image to generate a first detection value, and with regard to each direction of at least one portion of the directions, the detection module sums up absolute values of differences between a plurality of sets of second pixel values around the target pixel to generate a second detection value, wherein each set of the sets of first pixel values and the sets of second pixel values comprises two pixel values corresponding to a difference, two pixel values of a same set belong to a same color channel, each set of first pixel values does not comprise a pixel value of the target pixel, and each set of second pixel values comprises the pixel value of the target pixel. Additionally, with regard to a specific direction of the directions, the compensation module selectively performs bad pixel compensation on the target pixel according to the first detection value and the second detection value.

These and other objectives of the present invention will no doubt become obvious to those of ordinary skill in the art after reading the following detailed description of the preferred embodiment that is illustrated in the various figures and drawings.

DETAILED DESCRIPTION

Figure 1A:
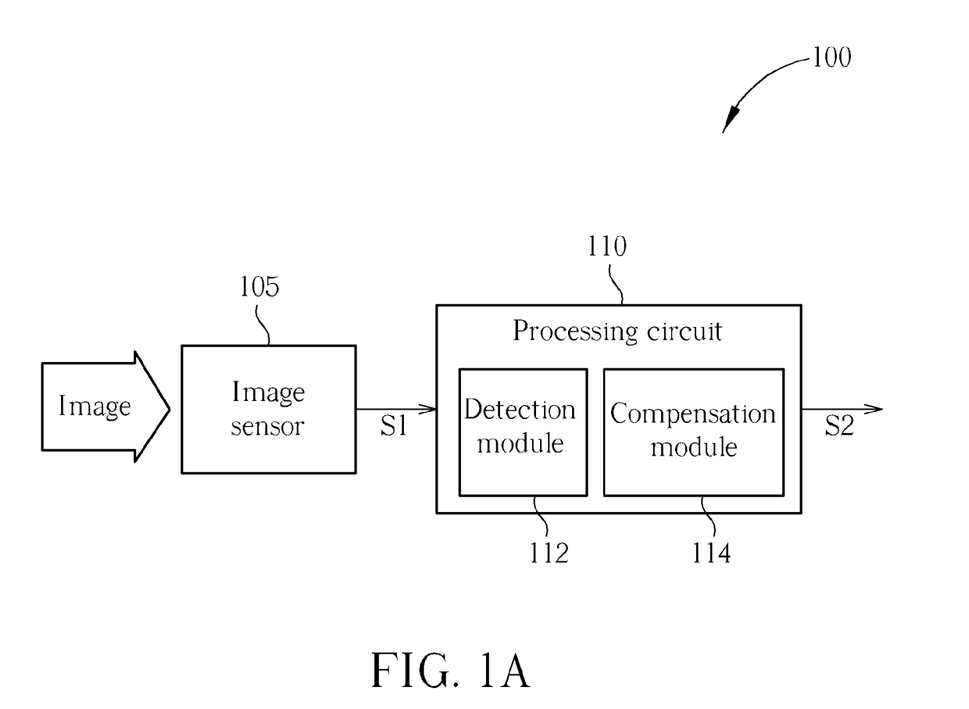
FIG. 1A is a diagram of an apparatus for performing bad pixel compensation according to a first embodiment of the present invention.

Please refer to FIG. 1A, which illustrates a diagram of an apparatus 100 for performing bad pixel compensation according to a first embodiment of the present invention. The apparatus 100 comprises an image sensor 105 and a processing circuit 110, and the processing circuit 110 comprises a detection module 112 and a compensation module 114. According to this embodiment, the processing circuit 110 receives at least one image signal 51 representing an image from the image sensor 105, and performs bad pixel compensation on the image, where the image is a Bayer pattern image. As shown in FIG. 1A, the processing circuit 110 can output at least one image signal S2 carrying a compensated image. In addition, the detection module 112 can perform detection to generate a plurality of detection values, and according to at least a portion of the detection values, the compensation module 114 can selectively perform bad pixel compensation on a target pixel. In practice, the detection module 112 and the compensation module 114 can be implemented by utilizing circuits. This is for illustrative purposes only, and is not meant to be a limitation of the present invention. According to some variations of this embodiment, such as a second embodiment shown in FIG. 1B, the aforementioned processing circuit 110 is replaced by a processing circuit 110', and the processing circuit 110' can execute a program code 110P to perform the same operations in the first embodiment, where the program code 110P comprises program modules such as the detection module 112' and the compensation module 114', which are equipped with the capability of performing the operations of the detection module 112 and the compensation module 114, respectively. In response to the change in architecture, the numeral 100 is replaced by the numeral 100' in the second embodiment.

Figure 1B:
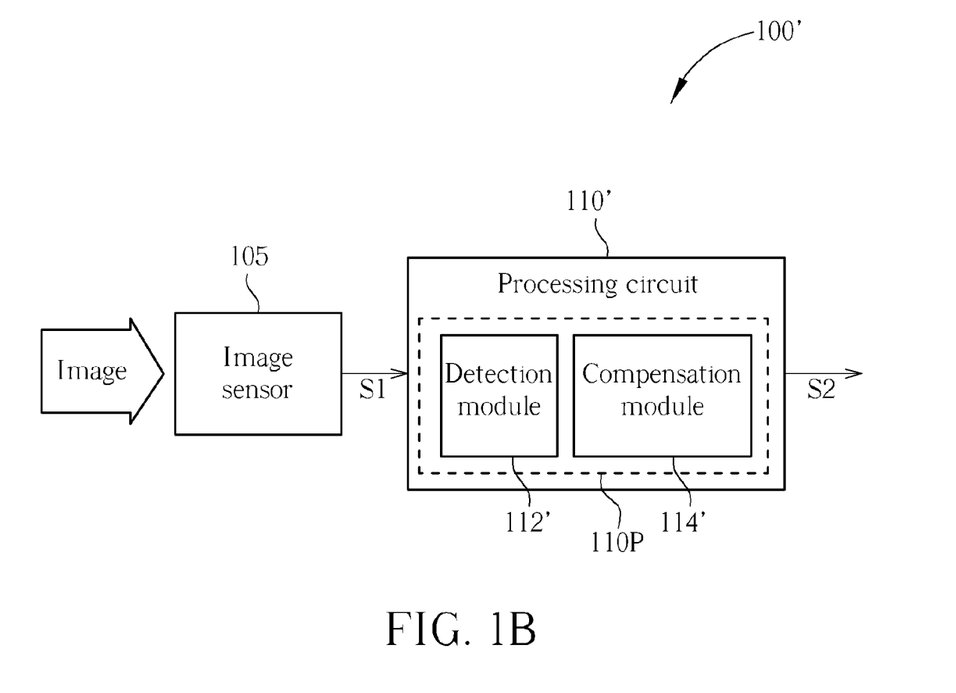
FIG. 1B is a diagram of an apparatus for performing bad pixel compensation according to a second embodiment of the present invention.

No matter whether the architecture shown in FIG. 1A or the architecture shown in FIG. 1B is utilized for implementation, the present invention can prevent the related art problems such as the problem of poor image quality. More particularly, the present invention can properly perform bad pixel compensation. Even in a situation where low end hardware resources are utilized for implementation, the present invention can still maintain high image quality. Please refer to FIG. 2 for related details of bad pixel compensation.

Figure 2:
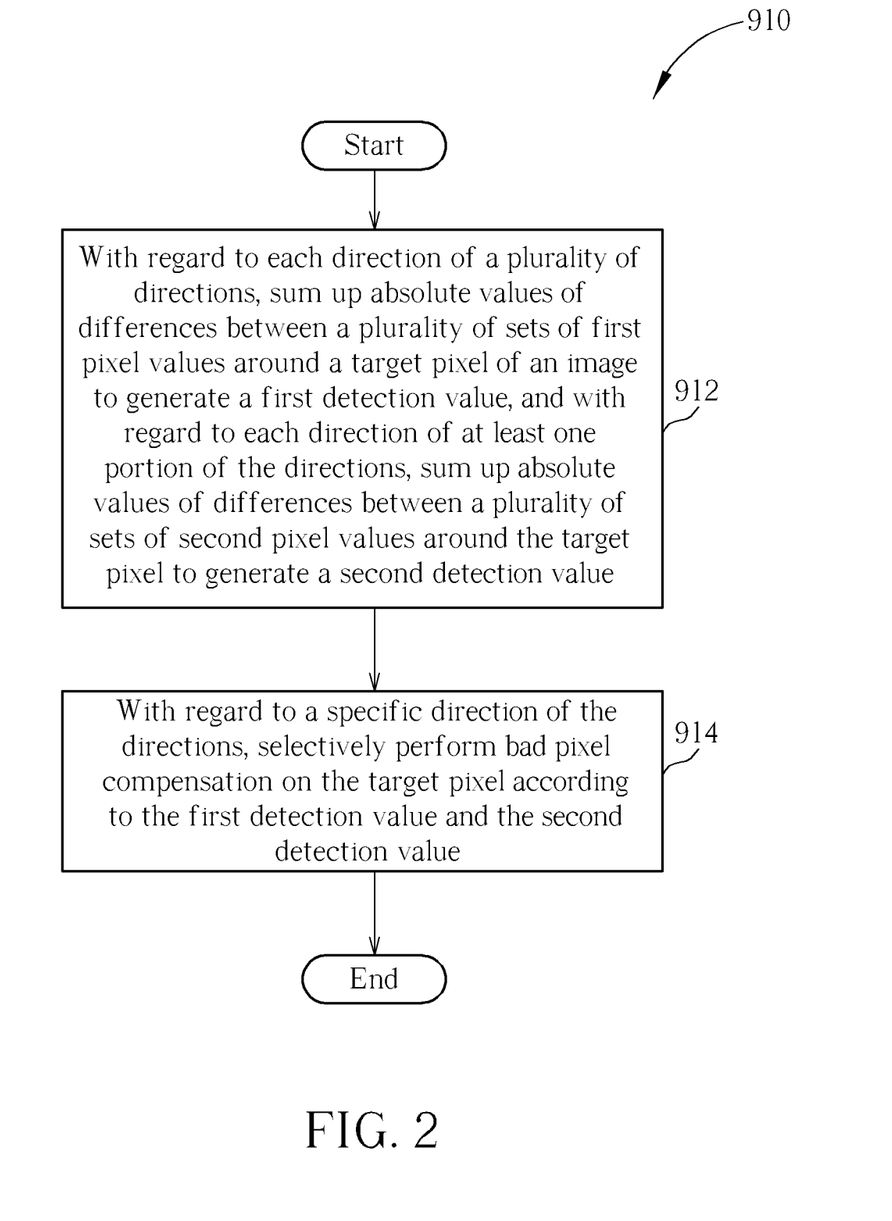
FIG. 2 is a flowchart of a method for performing bad pixel compensation according to an embodiment of the present invention.

FIG. 2 is a flowchart of a method 910 for performing bad pixel compensation according to an embodiment of the present invention. The method 910 can be applied to the apparatus 100 shown in FIG. 1A (or the apparatus 100' shown in FIG. 1B), and more particularly, to the processing circuit 110 of the first embodiment (or the processing circuit 110' of the second embodiment). For simplicity, the architecture of the first embodiment is utilized in the descriptions of this embodiment, where these descriptions are also suitable for the architecture of the second embodiment. The method 910 is described as follows.

In Step 912, with regard to each direction of a plurality of directions, the detection module 112 sums up absolute values of differences between a plurality of sets of first pixel values around a target pixel of an image (e.g. the aforementioned Bayer pattern image) to generate a first detection value, and with regard to each direction of at least one portion of the directions (e.g. each direction of the directions), the detection module 112 sums up absolute values of differences between a plurality of sets of second pixel values around the target pixel to generate a second detection value. That is, the first detection value is the summation of the absolute values of the differences between the sets of first pixel values, and the second detection value is the summation of the absolute values of the differences between the sets of second pixel values. More particularly, each set of the sets of first pixel values and the sets of second pixel values comprises two pixel values corresponding to a difference, and two pixel values of the same set belong to the same color channel. In addition, each set of first pixel values does not comprise a pixel value of the target pixel, and each set of second pixel values comprises the pixel value of the target pixel.

In Step 914, with regard to a specific direction of the directions, the compensation module 114 selectively performs bad pixel compensation on the target pixel according to the first detection value and the second detection value. In practice, the compensation module 114 can select the specific direction from the directions according to the first detection value of each direction of the directions, and then, with regard to the specific direction, the compensation module 114 can selectively perform bad pixel compensation on the target pixel according to the first detection value and the second detection value. For example, the first detection value of each direction may represent a detection value of image uniformity around the target pixel, and according to the magnitude of respective first detection values of the respective directions, the compensation module 114 can determine a direction of a possible edge and/or stroke near the target pixel and utilize this direction as the specific direction mentioned above.

In this embodiment, the directions comprise N directions, such as the directions {DN(n)}, where N is a positive integer, and n=1, 2, ..., or N. For example, in a situation where N=4, the directions DN(1), DN(2), DN(3), and DN(4) may represent the horizontal direction, the 45-degree direction, the vertical direction, and the 135-degree direction, respectively. For better comprehension, four parameters Horz, D45, Vert, and D135 are respectively defined as 1, 2, 3, and 4, which are the four indexes 1, 2, 3, and 4 of the directions DN(1), DN(2), DN(3), and DN(4), for use of indicating the horizontal direction, the 45-degree direction, the vertical direction, and the 135-degree direction in the pseudo codes of the following descriptions, respectively.

FIGS. 3-6 respectively illustrate some implementation details of the method 910 shown in FIG. 2 according an embodiment of the present invention, where the circles illustrated in FIGS. 3-6 represent pixels, and the notations in the respective circles, such as the sets {{V00, V01, V02, V03, V04}, {V10, V11, V12, V13, V14}, {V20, V21, V22, V23, V24}, {V30, V31, V32, V33, V34}, {V40, V41, V42, V43, V44}}, represent pixel values. Please note that, in each of FIGS. 3-6, the central pixel (whose pixel value is V22) is the target pixel mentioned in Step 912. In addition, the arrows shown in FIGS. 3-6 are utilized for indicating some possible sets of pixel values that may be selected as the respective sets of pixel values mentioned in Step 912, and each arrow corresponds to a set of pixel values, i.e. the "two pixel values corresponding to a difference" mentioned in Step 912. For example, as the image of this embodiment is a Bayer pattern image, in a situation where the pixel value V22 is a blue pixel value, the locations of the respective arrows shown in FIGS. 3-6 exactly comply with the sentence "two pixel values of the same set belong to the same color channel" mentioned in Step 912.

Figure 3:
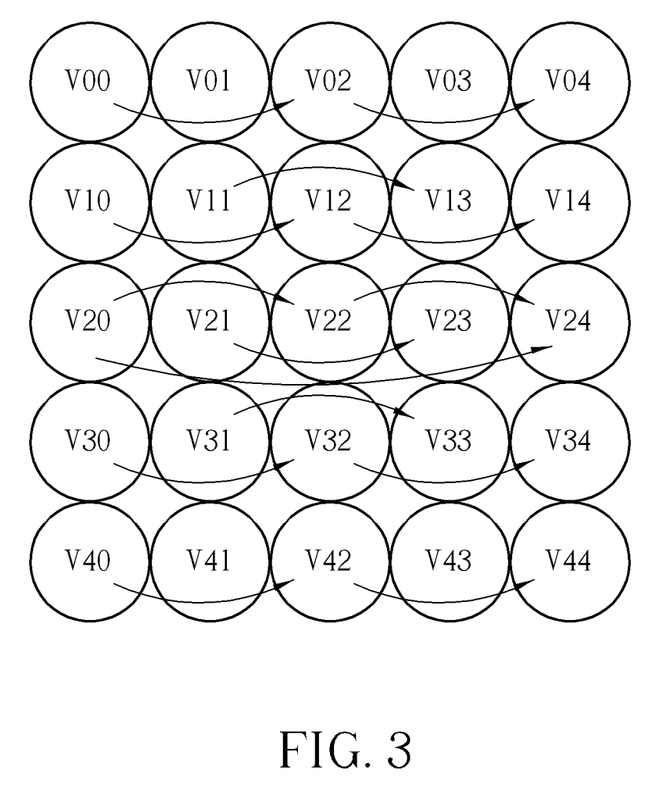
FIGS. 3-6 respectively illustrate some implementation details of the method shown in FIG. 2 according an embodiment of the present invention.

FIG. 3 illustrate a situation where the direction DN(n) is the horizontal direction DN(Horz) (i.e. n=Horz in FIG. 3), where some pseudo codes involved with the situation of FIG. 3 are listed as follows:

```
Det1[Horz] = abs(V10−V12)+abs(V12−V14)+
    abs(V11−V13)+abs(V31−V33)+
    abs(V20−V24)+abs(V21−V23)+
    abs(V30−V32)+abs(V32−V34);
Det1a[Horz] = abs(V00−V02)+abs(V02−V04)+
    abs(V40−V42)+abs(V42−V44);
if (mode==0) {
    Det1[Horz] = Det1[Horz]*3/2;
} else if (mode==1) {
    Det1[Horz] += Det1a[Horz];
}
Det2[Horz] = abs(V20−V22)+abs(V22−V24);
Cand[Horz] = (V20+V24)/2;
```

In the above pseudo codes, the notation "abs" in the first several lines represents absolute values, and linear combinations of these absolute values, such as Det1[n] and Det1a[n] (where n=Horz in FIG. 3), can be utilized for generating the first detection value mentioned in Step 912. For example, in a mode M1 (i.e., in a situation where "mode==1" is true), the first detection value can be the summation of the twelve absolute values in the first six lines of the above pseudo codes. In another example, in a mode M0 (i.e., in a situation where "mode==0" is true), the first detection value can be (3/2) times the summation of the eight absolute values in the first four lines of the above pseudo codes, where the magnification factor (3/2) is utilized for adjusting the first detection value to make the first detection value suitable for calculations of both modes, and therefore, the calculation loads and related costs can be reduced. Thus, after completing the operations represented by the first eleven lines of the above pseudo codes, the notation Det1[n] (where n=Horz in FIG. 3) may represent the first detection value mentioned in Step 912.

Please note that, as disclosed by most of the arrows shown in FIG. 3, with regard to each direction DN(n) of the directions mentioned in Step 912, such as the horizontal direction DN(1), the sets of first pixel values correspond to pixels on at least three straight lines arranged according to the direction. For example, in the mode M0, with regard to each direction DN(n) of the directions mentioned in Step 912, such as the horizontal direction DN(1), the sets of first pixel values correspond to pixels on three straight lines arranged according to the direction. In another example, in the mode M1, with regard to each direction DN(n) of the directions mentioned in Step 912, such as the horizontal direction DN(1), the sets of first pixel values correspond to pixels on five straight lines arranged according to the direction.

In addition, as disclosed by some other arrows shown in FIG. 3, with regard to each direction DN(n) of the directions mentioned in Step 912, such as the horizontal direction DN(1), the sets of second pixel values correspond to pixels on a straight line arranged according to the direction.

Additionally, in the last two lines of the above pseudo codes, the notations Det2[n] and Cand[n] (where n=Horz in FIG. 3) represent the second detection value mentioned in Step 912 and a candidate value involved with Step 914, respectively. Suppose that the specific direction mentioned in Step 914 is the direction DN(n0) in a situation where n=n0. In Step 914, when it is determined to perform bad pixel compensation on the target pixel, the compensation module 114 performs bad pixel compensation on the target pixel according to the candidate value Cand[n] (e.g. n=n0), where the candidate value Cand[n] corresponds to a portion of pixel values within the sets of second pixel values of the specific direction. More particularly, the candidate value Cand[n] is an average value of pixel values within the sets of second pixel values of the specific direction (such as the pixel values {V20, V22} and {V22, V24}) except for the pixel value V22 of the target pixel, i.e. the average value of the pixel values {V20, V24} in FIG. 3. In a situation where n0=Horz, this average value is equal to ((V20+V24)/2).

Figure 4:
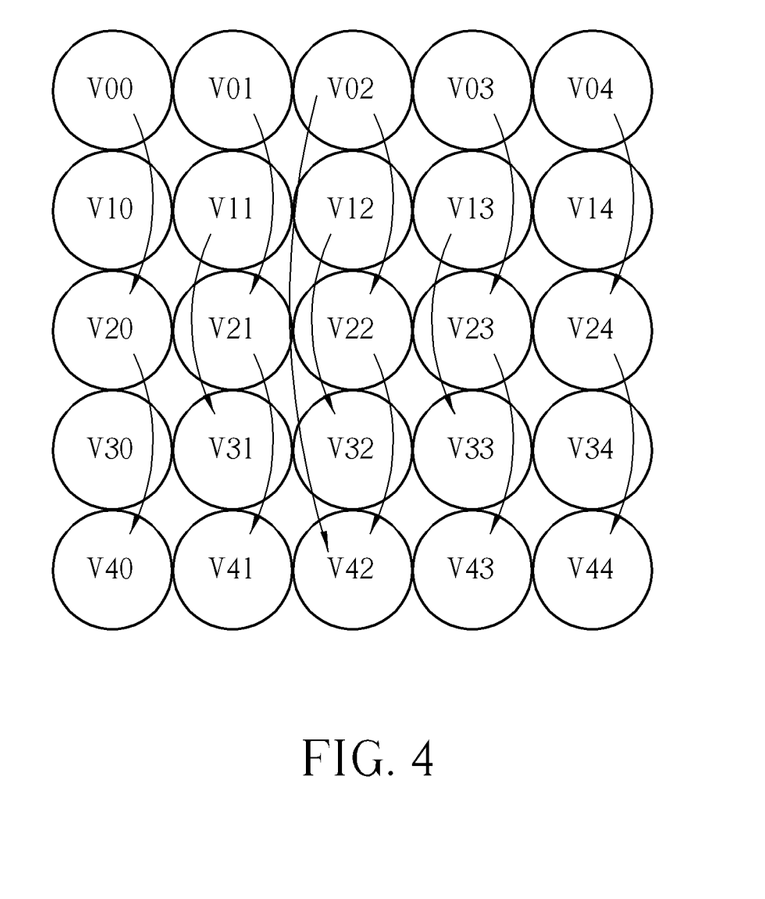

FIG. 4 illustrate a situation where the direction DN(n) is the vertical direction DN(Vert) (i.e. n=Vert in FIG. 4), where some pseudo codes involved with the situation of FIG. 4 are listed as follows:

```
Det1[Vert] = abs(V01-V21)+abs(V21-V41)+
             abs(V11-V31)+abs(V13-V33)+
             abs(V02-V42)+abs(V12-V32)+
             abs(V03-V23)+abs(V23-V43);
Det1a[Vert] = abs(V00-V20)+abs(V20-V40)+
              abs(V04-V24)+abs(V24-V44);
if (mode==0) {
    Det1[Vert] = Det1[Vert]*3/2;
} else if (mode==1) {
    Det1[Vert] += Det1a[Vert];
}
Det2[Vert] = abs(V02-V22)+abs(V22-V42);
Cand[Vert]= (V02+V42)/2;
```

In the above pseudo codes, in response to the situation where n=Vert, the respective pixel values that can probably be utilized for calculating the first detection value mentioned in Step 912 are replaced, and the respective pixel values that can probably be utilized for calculating the second detection value mentioned in Step 912 are replaced, where the locations of the respective arrows are correspondingly changed in FIG. 4, for indicating some possible sets of pixel values that may be utilized. In addition, the pixel values that can be utilized for calculating the candidate value Cand[n] (where n=Vert in FIG. 4) are correspondingly replaced. Similar descriptions are not repeated in detail for FIG. 4.

Figure 5:
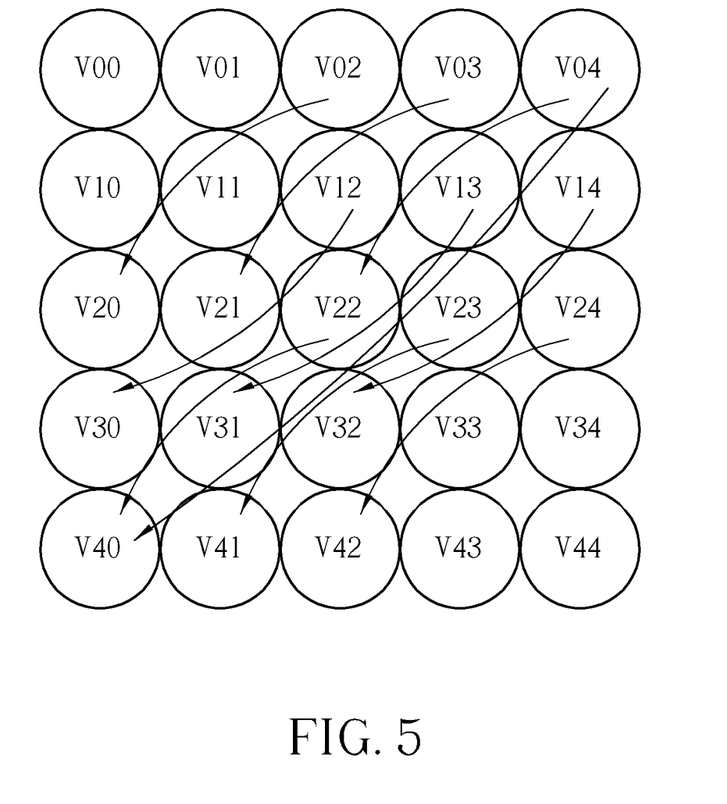

FIG. 5 illustrate a situation where the direction DN(n) is the 45-degree direction DN(D45) (i.e. n=D45 in FIG. 5), where some pseudo codes involved with the situation of FIG. 5 are listed as follows:

```
Det1[D45] = abs(V02-V20)+abs(V03-V21)+
            abs(V12-V30)+abs(V14-V32)+
            abs(V13-V31)+abs(V04-V40)+
            abs(V23-V41)+abs(V24-V42);
Det1[D45] = Det1[D45]*3/2;
Det2[D45] = abs(V04-V22)+abs(V22-V40);
Cand[D45] = (V04+V40)/2;
```

In the above pseudo codes, in response to the situation where n=D45, the respective pixel values that can probably be utilized for calculating the first detection value mentioned in Step 912 are replaced, and the respective pixel values that can probably be utilized for calculating the second detection value mentioned in Step 912 are replaced, where the locations of the respective arrows are correspondingly changed in FIG. 5, for indicating some possible sets of pixel values that may be utilized. In addition, the pixel values that can be utilized for calculating the candidate value Cand[n] (where n=D45 in FIG. 5) are correspondingly replaced. Similar descriptions are not repeated in detail for FIG. 5.

Figure 6:
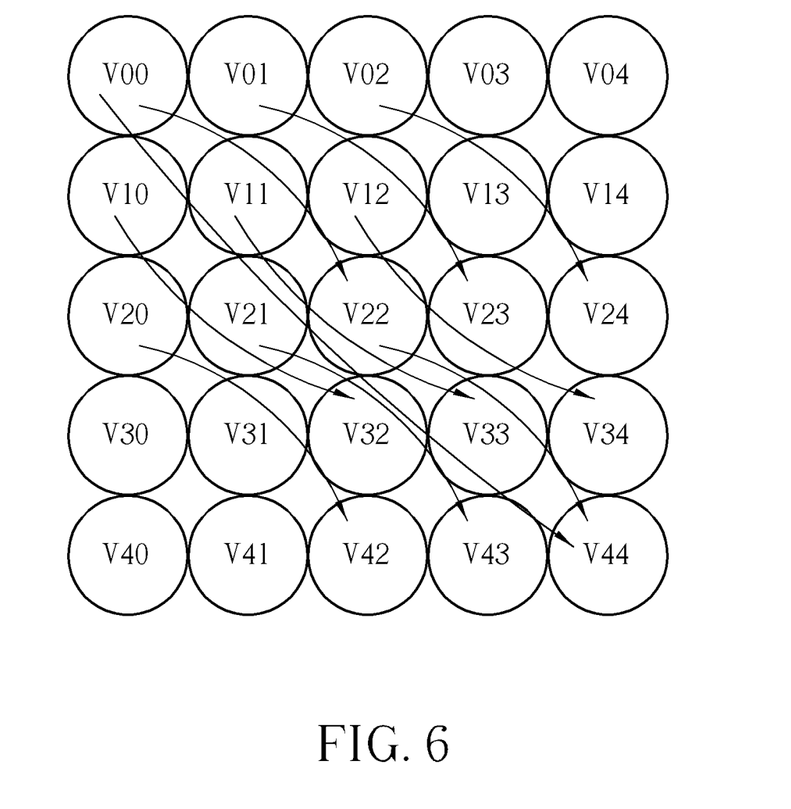

FIG. 6 illustrate a situation where the direction DN(n) is the 135-degree direction DN(D135) (i.e. n=D135 in FIG. 6), where some pseudo codes involved with the situation of FIG. 6 are listed as follows:

```
Det1[D135] = abs(V01-V23)+abs(V02-V24)+
             abs(V10-V32)+abs(V12-V34)+
             abs(V11-V33)+abs(V00-V44)+
             abs(V20-V42)+abs(V21-V43);
Det1[D135] = Det1D135*3/2;
Det2[D135] = abs(V00-V22)+abs(V22-V44);
Cand[D135] = (V00+V44)/2;
```

In the above pseudo codes, in response to the situation where n=D135, the respective pixel values that can probably be utilized for calculating the first detection value mentioned in Step 912 are replaced, and the respective pixel values that can probably be utilized for calculating the second detection value mentioned in Step 912 are replaced, where the locations of the respective arrows are correspondingly changed in FIG. 6, for indicating some possible sets of pixel values that may be utilized. In addition, the pixel values that can be utilized for calculating the candidate value Cand[n] (where n=D135 in FIG. 6) are correspondingly replaced. Similar descriptions are not repeated in detail for FIG. 6.

According to this embodiment, the compensation module 114 selects the direction DN(n0) whose first detection value is the minimum of the respective first detection values {Det1[n]} from the directions {DN(n)} as the specific direction, which means the first detection values Det1[n0] is the minimum of the respective first detection values {Det1[n]} of the respective directions {DN(n)}. Thus, the specific direction mentioned in Step 914 is the direction DN(n0) in the situation where n=n0, and with some condition(s) being satisfied, the compensation module 114 can utilize the candidate value Cand[n] (e.g. n=n0) to replace the pixel value of the target pixel, such as the pixel value V22, in order to perform bad pixel compensation on the target pixel, where an exemplary pseudo code of this operation is listed as follows:

```
if (Det2[n0]*16 > Det1[n0]*Thrd1+Thrd2*16) {
    V22 = Cand[n0];
}
```

As disclosed in the above pseudo code, the compensation module 114 compares the second detection value Det2[n0] of the specific direction DN(n0) with a threshold value TH to determine whether to perform bad pixel compensation on the target pixel, where the threshold value TH corresponds to the first detection value Det1[n0] of the specific direction DN(n0). When it is determined to perform bad pixel compensation on the target pixel, the compensation module 114 performs bad pixel compensation on the target pixel. For example, the threshold value TH of this embodiment can be described as follows:

$$TH=(Det1[n0]*Thrd1+Thrd2*16)/16;$$

where the relationship between the threshold value TH and the first detection value Det1[n0] of the specific direction DN(n0) is a linear relationship, and the notations Thrd1 and Thrd2 may represent fixed values or predetermined values. In practice, for the purpose of simplifying the calculations, both the second detection value Det2[n0] and the threshold value TH are multiplied by 16 in the first line of the above pseudo code, in order to prevent the compensation module 114 from performing any division operation.

Please note that, according to the embodiment shown in FIGS. 3-6, with regard to each direction of the directions, the detection module 112 sums up the absolute values of the differences between the plurality of sets of second pixel values around the target pixel to generate the second detection value in Step 912. This is for illustrative purposes only, and is not meant to be a limitation of the present invention. According to some variations of this embodiment, with regard to the specific direction, the detection module 112 sums up the absolute values of the differences between the plurality of sets of second pixel values around the target pixel to generate the second detection value in Step 912. That is, with regard to other directions of the plurality of directions mentioned in Step 912 (i.e. the directions except for the specific direction), the detection module 112 of these variations has no need to calculate/generate any second detection value in Step 912.

It is an advantage of the present invention that the present invention can prevent the related art problems such as the problem of poor image quality. More particularly, the present invention can properly perform bad pixel compensation. Even in a situation where low end hardware resources are utilized for implementation, the present invention can still maintain high image quality.

Those skilled in the art will readily observe that numerous modifications and alterations of the device and method may be made while retaining the teachings of the invention.

What is claimed is:

1. A method for performing bad pixel compensation, the method comprising:

with regard to each direction of a plurality of directions, summing up absolute values of differences between a plurality of sets of first pixel values around a target pixel of an image to generate a first detection value, and with regard to each direction of at least one portion of the directions, summing up absolute values of differences between a plurality of sets of second pixel values around the target pixel to generate a second detection value, wherein each set of the sets of first pixel values and the sets of second pixel values comprises two pixel values corresponding to a difference, two pixel values of a same set belong to a same color channel, each set of first pixel values does not comprise a pixel value of the target pixel, and each set of second pixel values comprises the pixel value of the target pixel; and with regard to a specific direction of the directions, selectively performing bad pixel compensation on the target pixel according to the first detection value and the second detection value.

2. The method of claim 1, wherein with regard to each direction of the directions, the sets of first pixel values correspond to pixels on at least three straight lines arranged according to the direction.

3. The method of claim 1, wherein with regard to each direction of the at least one portion of the directions, the sets of second pixel values correspond to pixels on a straight line arranged according to the direction.

4. The method of claim 1, wherein the step of selectively performing bad pixel compensation on the target pixel according to the first detection value and the second detection value further comprises:

selecting the specific direction from the directions according to the first detection value of each direction of the directions.

5. The method of claim 1, wherein the step of selectively performing bad pixel compensation on the target pixel according to the first detection value and the second detection value further comprises:

comparing the second detection value of the specific direction with a threshold value to determine whether to perform bad pixel compensation on the target pixel, wherein the threshold value corresponds to the first detection value of the specific direction; and when it is determined to perform bad pixel compensation on the target pixel, performing bad pixel compensation on the target pixel.

6. The method of claim 5, wherein a relationship between the threshold value and the first detection value of the specific direction is a linear relationship.

7. The method of claim 1, wherein the step of selectively performing bad pixel compensation on the target pixel according to the first detection value and the second detection value further comprises:

when it is determined to perform bad pixel compensation on the target pixel, performing bad pixel compensation on the target pixel according to a candidate value, wherein the candidate value corresponds to a portion of pixel values within the sets of second pixel values of the specific direction.

8. The method of claim 7, wherein the candidate value is an average value of pixel values within the sets of second pixel values of the specific direction except for the pixel value of the target pixel.

9. The method of claim 7, wherein the step of selectively performing bad pixel compensation on the target pixel according to the first detection value and the second detection value further comprises:

utilizing the candidate value to replace the pixel value of the target pixel, in order to perform bad pixel compensation on the target pixel.

10. The method of claim 1, wherein the image is a Bayer pattern image.

11. An apparatus for performing bad pixel compensation, the apparatus comprising:

a processing circuit arranged to receive at least one image signal representing an image and perform bad pixel compensation on the image, wherein the processing circuit comprises:

a detection module, wherein with regard to each direction of a plurality of directions, the detection module sums up absolute values of differences between a plurality of sets of first pixel values around a target pixel of an image to generate a first detection value, and with regard to each direction of at least one portion of the directions, the detection module sums up absolute values of differences between a plurality of sets of second pixel values around the target pixel to generate a second detection value, wherein each set of the sets of first pixel values and the sets of second pixel values comprises two pixel values corresponding to a difference, two pixel values of a same set belong to a same color channel, each set of first pixel values does not comprise a pixel value of the target pixel, and each set of second pixel values comprises the pixel value of the target pixel; and a compensation module, wherein with regard to a specific direction of the directions, the compensation module selectively performs bad pixel compensation on the target pixel according to the first detection value and the second detection value.

12. The apparatus of claim 11, wherein with regard to each direction of the directions, the sets of first pixel values correspond to pixels on at least three straight lines arranged according to the direction.

13. The apparatus of claim 11, wherein with regard to each direction of the at least one portion of the directions, the sets of second pixel values correspond to pixels on a straight line arranged according to the direction.

14. The apparatus of claim 11, wherein the compensation module selects the specific direction from the directions according to the first detection value of each direction of the directions.

15. The apparatus of claim 11, wherein the compensation module compares the second detection value of the specific direction with a threshold value to determine whether to perform bad pixel compensation on the target pixel, and the threshold value corresponds to the first detection value of the specific direction; and when it is determined to perform bad pixel compensation on the target pixel, the compensation module performs bad pixel compensation on the target pixel.

16. The apparatus of claim 15, wherein a relationship between the threshold value and the first detection value of the specific direction is a linear relationship.

17. The apparatus of claim 11, wherein when it is determined to perform bad pixel compensation on the target pixel, the compensation module performs bad pixel compensation on the target pixel according to a candidate value, and the candidate value corresponds to a portion of pixel values within the sets of second pixel values of the specific direction.

18. The apparatus of claim 17, wherein the candidate value is an average value of pixel values within the sets of second pixel values of the specific direction except for the pixel value of the target pixel.

19. The apparatus of claim 17, wherein the compensation module utilizes the candidate value to replace the pixel value of the target pixel, in order to perform bad pixel compensation on the target pixel.

20. The apparatus of claim 11, wherein the image is a Bayer pattern image.

* * * * *